US 9,615,267 B2

(12) United States Patent
Fu et al.

(10) Patent No.: US 9,615,267 B2
(45) Date of Patent: Apr. 4, 2017

(54) METHOD AND APPARATUS FOR TRANSMITTING HARQ-ACK FEEDBACK INFORMATION BY A USER EQUIPMENT IN A WIRELESS COMMUNICATION SYSTEM

(71) Applicant: Samsung Electronics Co., Ltd., Gyeonggi-do (KR)

(72) Inventors: Jingxing Fu, Beijing (CN); Chengjun Sun, Beijing (CN); Yingyang Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 95 days.

(21) Appl. No.: 13/945,601

(22) Filed: Jul. 18, 2013

(65) Prior Publication Data

US 2014/0022960 A1   Jan. 23, 2014

(30) Foreign Application Priority Data

Jul. 18, 2012  (CN) .......................... 2012 1 0249342

(51) Int. Cl.
*H04W 4/00*  (2009.01)
*H04W 24/02*  (2009.01)
(Continued)

(52) U.S. Cl.
CPC .......... *H04W 24/02* (2013.01); *H04L 1/1854* (2013.01); *H04L 5/0055* (2013.01); *H04L 5/001* (2013.01); *H04L 5/143* (2013.01); *H04L 5/1469* (2013.01)

(58) Field of Classification Search
USPC ................... 370/276–292, 310–350
See application file for complete search history.

(56) References Cited

U.S. PATENT DOCUMENTS

2010/0211845 A1   8/2010  Lee et al.
2011/0138244 A1   6/2011  Zhu et al.
(Continued)

FOREIGN PATENT DOCUMENTS

| WO | WO 2011/075702 | 6/2011 |
| WO | WO 2012/029873 | 3/2012 |
| WO | WO 2012/109195 | 8/2012 |

OTHER PUBLICATIONS

Yong Li, Qin Mu, Liu Liu, Lan Chen, Mugen Peng and Wenbo Wang, "Control Channel Design for Carrier Aggregation between LTE FDD and LTE TDD Systems" 2012 IEEE.*
(Continued)

*Primary Examiner* — Kwang B Yao
*Assistant Examiner* — Juvena Loo
(74) *Attorney, Agent, or Firm* — The Farrell Law Firm, P.C.

(57) ABSTRACT

An apparatus and method are provided for transmitting Hybrid Automatic Repeat reQuest ACKnowledgment (HARQ-ACK) feedback information by a User Equipment (UE) in a wireless communication system, when Component Carriers (CCs) configured for the UE include a Frequency Division Duplexing (FDD) CC and a Time Division Duplexing (TDD) CC. The method includes determining a HARQ-ACK timing and a CC for transmitting the HARQ-ACK feedback information, based on a composition structure of the CCs configured for the UE, and transmitting the HARQ-ACK feedback information on a Physical Uplink Control CHannel (PUCCH) or a Physical Uplink Shared CHannel (PUSCH) of the determined CC, based on the determined HARQ-ACK timing.

19 Claims, 6 Drawing Sheets

(51) Int. Cl.
*H04L 1/18* (2006.01)
*H04L 5/00* (2006.01)
*H04L 5/14* (2006.01)

(56) References Cited

U.S. PATENT DOCUMENTS

| | | |
|---|---|---|
| 2011/0205976 A1 | 8/2011 | Roessel et al. |
| 2011/0261679 A1 | 10/2011 | Li et al. |
| 2012/0134305 A1 | 5/2012 | Damnjanovic et al. |
| 2012/0257552 A1* | 10/2012 | Chen et al. .................. 370/280 |
| 2013/0028149 A1* | 1/2013 | Chen .................... H04L 5/0005 370/280 |
| 2013/0170406 A1 | 7/2013 | Kishiyama |
| 2013/0343239 A1* | 12/2013 | Damnjanovic ......... H04L 5/001 370/280 |
| 2014/0161002 A1* | 6/2014 | Gauvreau ............. H04W 16/24 370/280 |
| 2014/0204854 A1* | 7/2014 | Freda et al. ................. 370/329 |

OTHER PUBLICATIONS

U.S. Appl. No. 61/512,825, Chen.*
U.S. Appl. No. 61/663,468, Damnjanovic.*
Australian Examination Report dated Jun. 10, 2016 issued in counterpart application No. 2013290901, 3 pages.
Yong Li et al., "Control Channel Design for Carrier Aggregation between LTE FDD and LTE TDD Systems", IEEE 75th Vehicular Technology Conference, May 6-9, 2012, 5 pages.
European Search Report dated Feb. 10, 2016 issued in counterpart application No. 13819946.8-1851, 9 pages.

\* cited by examiner

METHOD AND APPARATUS FOR TRANSMITTING HARQ-ACK FEEDBACK INFORMATION BY A USER EQUIPMENT IN A WIRELESS COMMUNICATION SYSTEM

PRIORITY

This application claims priority under 35 U.S.C. §119(a) to Chinese Patent Application Serial No. 201210249342.8, which was filed in the Chinese Patent Office on Jul. 18, 2012, the entire content of which is hereby incorporated by reference.

BACKGROUND OF THE INVENTION

1. Field of the Invention

The present invention relates generally to radio communication system technologies, and more particularly, to a method and apparatus for transmitting Hybrid Automatic Repeat reQuest ACKnowledgment (HARQ-ACK) feedback information.

2. Description of the Related Art

A Long Term Evolution (LTE) system supports two duplexing modes, i.e., Frequency Division Duplexing (FDD) and Time Division Duplexing (TDD).

FIG. 1 illustrates a frame structure of a conventional TDD system.

Referring to FIG. 1, a length of each radio frame is 10 ms, and each radio frame is divided into two 5 ms half-frames. Each half-frame includes eight 0.5 ms time slots and three special fields, i.e., a Downlink Pilot Time Slot (DwPTS), a Guard Period (GP), and an Uplink Pilot Time Slot (UpPTS). The total length of the three special fields is 1 ms.

Each subframe includes two consecutive time slots. For example, a frame k includes slot $2k$ and slot $2k+1$.

The TDD system supports seven TDD uplink/downlink configurations, as shown in Table 1 below. In Table 1, D denotes a downlink subframe, U denotes an uplink subframe, and S denotes a special subframe with the above-mentioned three special fields.

TABLE 1

| Index number of configuration | Switching point period | index of subframe | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

To improve a user transmission rate, an LTE-Advanced (LTE-A) system has been proposed. In LTE-A, multiple Component Carriers (CCs) are aggregated to obtain greater bandwidth, i.e., Carrier Aggregation (CA), which constitutes a downlink and an uplink of a communication system to support a higher transmission rate. For example, a 100 MHz bandwidth may be achieved by aggregating five 20 MHz CCs. Herein, each CC may be referred to as a Cell.

A Base Station (BS) may configure a User Equipment (UE) to work in multiple CCs, one of which is a primary CC (PCC or Pcell), while any other CCs are a secondary CC (SCC or Scell).

In the LTE-A system, all of the CCs aggregated together are configured with an FDD configuration or are all configured with a TDD configuration.

However, to further improve a user transmission rate, subsequent research is being performed on LTE-A in the hopes of determining a method to effectively support a CC configured with a TDD configuration and a CC configured with a FDD configuration to perform carrier aggregation. For example, when carrier aggregation includes a CC configured with a TDD configuration and a CC configured with a FDD configuration, the is no current way for a UE to determine a HARQ-ACK timing for transmitting HARQ-ACK.

SUMMARY OF THE INVENTION

Accordingly, the present invention is designed to address at least the problems and/or disadvantages described above and to provide at least the advantages described below.

An aspect of the present invention is to provide a method and an apparatus for transmitting HARQ-ACK feedback information, which can effectively achieve HARQ-ACK information transmission when a TDD CC and an FDD CC are aggregated.

In accordance with an aspect of the present invention, a method is provided for transmitting HARQ-ACK feedback information by a UE in a wireless communication system, when CCs configured for the UE include an FDD CC and a TDD CC. The method includes determining a HARQ-ACK timing and a CC for transmitting the HARQ-ACK feedback information, based on a composition structure of the CCs configured for the UE, and transmitting the HARQ-ACK feedback information on a Physical Uplink Control CHannel (PUCCH) or a Physical Uplink Shared CHannel (PUSCH) of the determined CC, based on the determined HARQ-ACK timing.

In accordance with another aspect of the present invention, a UE is provided for transmitting HARQ-ACK feedback information in a wireless communication system, when CCs configured for the UE include an FDD CC and a TDD CC. The UE includes a controller for determining a HARQ-ACK timing and a CC for transmitting the HARQ-ACK feedback information, based on a composition structure of the CCs configured for the UE, and a transmitter for transmitting the HARQ-ACK feedback information on a PUCCH or a PUSCH of the determined CC, based on the determined HARQ-ACK timing.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

For a TDD uplink/downlink configuration, according to a ratio of downlink subframes and uplink subframes, HARQ-ACK feedback information of a downlink transmission within zero, i.e., no HARQ-ACK feedback information is transmitted in the uplink subframe, at least one downlink subframe may be transmitted in one uplink subframe. The zero downlink subframes for which the HARQ-ACK feedback information is transmitted within a same uplink subframe is referred to as "a bundling window" corresponding to the uplink subframe. Accordingly, the number of the downlink subframes included in the bundling window referred to as the size of the bundling window.

For a UE of a CA system configured with a TDD CC and an FDD CC, it is assumed herein that CCs configured for the UE include at least one FDD CC and at least one TDD CC.

Figure 1:
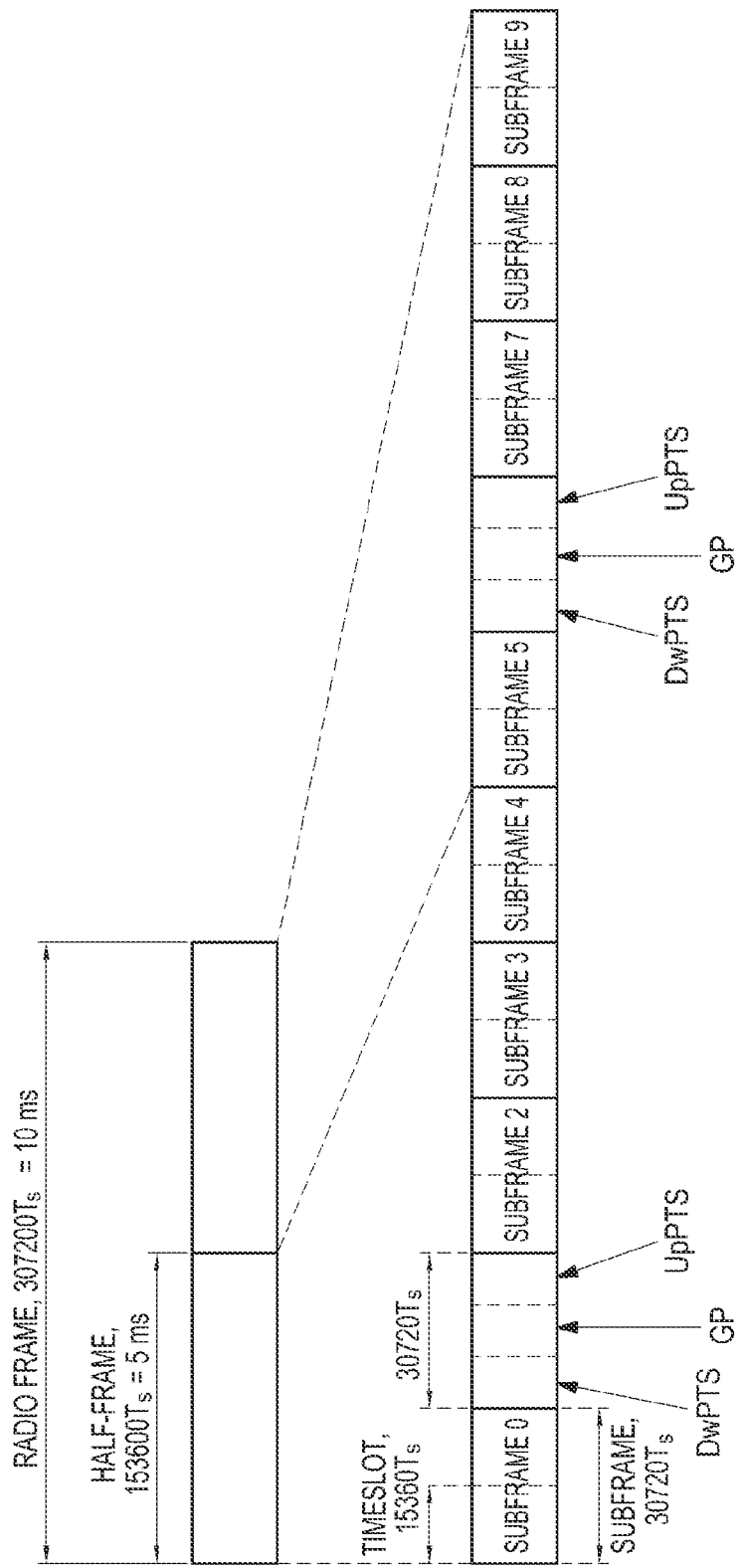
FIG. 1 illustrates a frame structure in a conventional TDD system.
Figure 2:
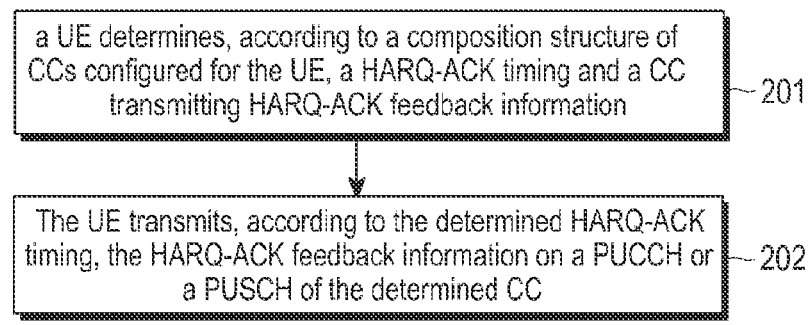
FIG. 2 is a flowchart illustrating a method for transmitting HARQ-ACK feedback information in accordance with an embodiment of the present invention.

FIG. 2 is a flowchart illustrating a method for transmitting HARQ-ACK feedback information in accordance with an embodiment of the present invention.

Referring to FIG. 2, in step 201, a UE determines a HARQ-ACK timing and a CC transmitting HARQ-ACK feedback information, based on a composition structure of CCs configured for the UE.

In step 202, the UE transmits the HARQ-ACK feedback information on a PUCCH or a PUSCH of the determined CC, based on the determined HARQ-ACK timing.

In accordance with an embodiment of the present invention, CCs configured for a UE are grouped into two groups, i.e., all CCs configured with an FDD configuration are grouped into one group, and all CCs configured with a TDD configuration are grouped into the other group. All of the CCs in the group with the FDD configuration follow an FDD HARQ-ACK timing, and all HARQ-ACK information of the group is transmitted on the PCC. For each of the CCs in the group with the TDD configuration, a HARQ-ACK timing is determined according to TDD uplink/downlink configurations of the CCs in the group (as shown in Table 1 above), and all HARQ-ACK information of the group with TDD configuration is transmitted on a specific CC determined from the TDD CCs.

RRC signaling may be used to indicate which CC is used for transmitting the HARQ-ACK information among the CCs in the group with TDD configuration. The indicated CC is commonly referred to as a second PCC.

Figure 3:
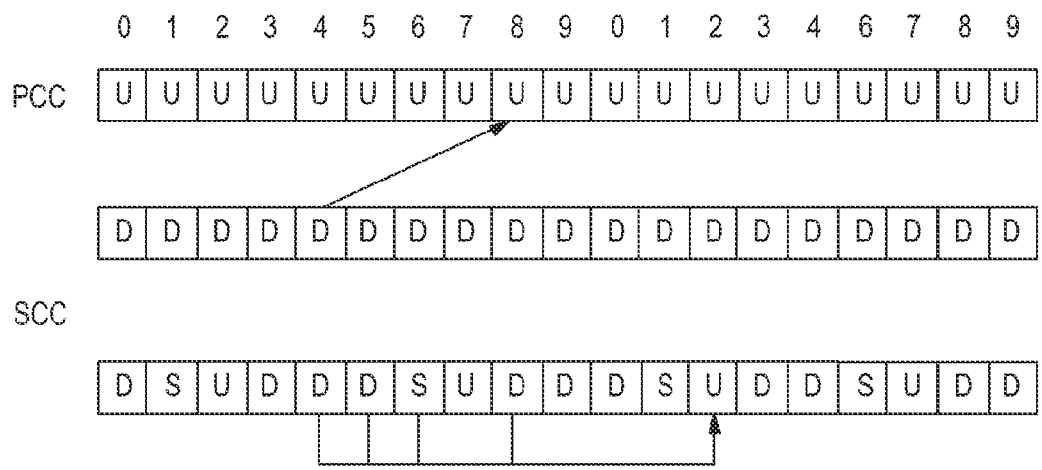
FIG. 3 illustrates HARQ-ACK timing and a determination of a CC transmitting HARQ-ACK feedback information in accordance with an embodiment of the present invention.

FIG. 3 illustrates HARQ-ACK timing and a determination of a CC transmitting HARQ-ACK feedback information in accordance with an embodiment of the present invention. In FIG. 3, it is assumed that a BS configures two CCs for a CA UE, i.e., a PCC and an SCC.

Referring to FIG. 3, the PCC is configured with an FDD configuration, and the SCC is configured with TDD uplink/downlink configuration 2. In this combination, the PCC follows an FDD HARQ-ACK timing, and HARQ-ACK information of the PCC is transmitted on the PCC. The SCC follows a HARQ-ACK timing of TDD uplink/downlink configuration 2, and HARQ-ACK information of the SCC is transmitted on the SCC.

In accordance with an embodiment of the present invention, CCs configured for the UE are grouped into two groups, i.e., all of the CCs configured with an FDD configuration are grouped into one group, and all of the CCs configured with a TDD configuration are grouped into the other group. All of the CCs in the group with the FDD configuration follow an FDD HARQ-ACK timing, and HARQ-ACK information of the group is transmitted on the PCC. The CCs in the group with the TDD configuration determine a HARQ-ACK timing for each CC according to TDD uplink/downlink configurations of the CCs in the group, and HARQ-ACK information of the group with TDD configuration is transmitted on the FDD PCC.

Figure 4:
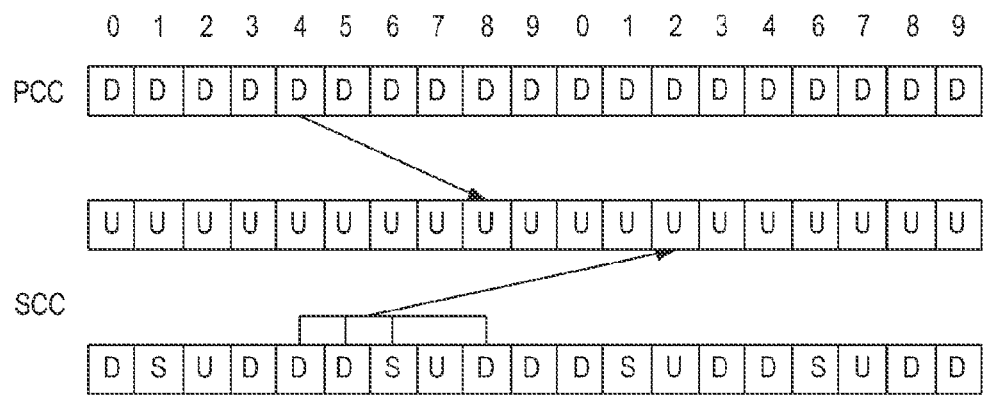
FIG. 4 illustrates HARQ-ACK timing and a determination of a CC transmitting HARQ-ACK feedback information in accordance with an embodiment of the present invention.

FIG. 4 illustrates HARQ-ACK timing and a determination of a CC transmitting HARQ-ACK feedback information in accordance with an embodiment of the present invention. In FIG. 4, it is assumed that a BS configures two CCs for a CA UE, i.e., a PCC and an SCC.

Referring to FIG. 4, the PCC is configured with an FDD configuration, and the SCC is configured with TDD uplink/downlink configuration 2. In this combination, the PCC follows an FDD HARQ-ACK timing, and HARQ-ACK information of the PCC is transmitted on the PCC. The SCC follows a HARQ-ACK timing of TDD uplink/downlink configuration 2, and HARQ-ACK information of the SCC is transmitted on the FDD PCC.

In accordance with an embodiment of the present invention, all CCs configured for the UE follow an FDD HARQ-ACK timing, and all HARQ-ACK information is transmitted on the FDD PCC. Specifically, an FDD CC follows the FDD HARQ-ACK timing. For a TDD CC, a HARQ-ACK timing of a TDD downlink subframe is determined according to a HARQ-ACK timing of an FDD downlink subframe that is on the same subframe timing as the TDD downlink subframe. HARQ-ACK information of all of the CCs is transmitted on the FDD PCC. In this method, timing of all of the CCs is consistent, and HARQ-ACK information of all of the CCs is transmitted on the PCC, so that the implementation complexity is lower compared with the methods illustrated in FIGS. 3 and 4.

Figure 5:
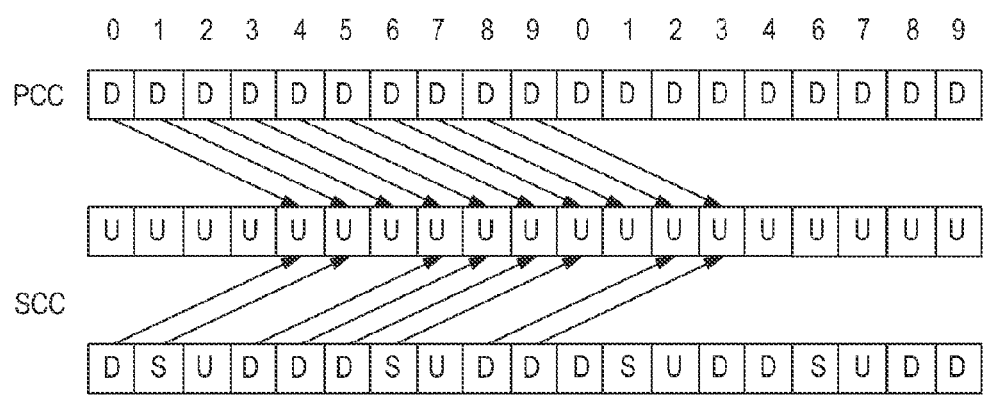
FIG. 5 illustrates HARQ-ACK timing and a determination of a CC transmitting HARQ-ACK feedback information in accordance with an embodiment of the present invention.

FIG. 5 illustrates HARQ-ACK timing and a determination of a CC transmitting HARQ-ACK feedback information in accordance with an embodiment of the present invention. In FIG. 5, it is assumed that a BS configures two CCs for a CA UE, i.e., a PCC and an SCC.

Referring to FIG. 5, the PCC is configured with an FDD configuration, and the SCC is configured with TDD uplink/downlink configuration 2. In this combination, the PCC follows an FDD HARQ-ACK timing, and HARQ-ACK information of the PCC is transmitted on the PCC. The SCC follows the FDD HARQ-ACK timing, and HARQ-ACK information of the SCC is transmitted on the PCC.

In accordance with an embodiment of the present invention, CCs configured for the UE are grouped into two groups, i.e., all of the CCs configured with an FDD configuration are grouped into one group, and all of the CCs configured with a TDD configuration are grouped into the other group. All of the CCs in the group with the FDD configuration follow an FDD HARQ-ACK timing, and HARQ-ACK information of the group is transmitted on a specific FDD PCC. For each CC in the group with the TDD configuration, a HARQ-ACK timing is determined according to TDD uplink/downlink configurations of the CCs in the group, and HARQ-ACK information of the group with the TDD configuration is transmitted on the PCC.

Figure 6:
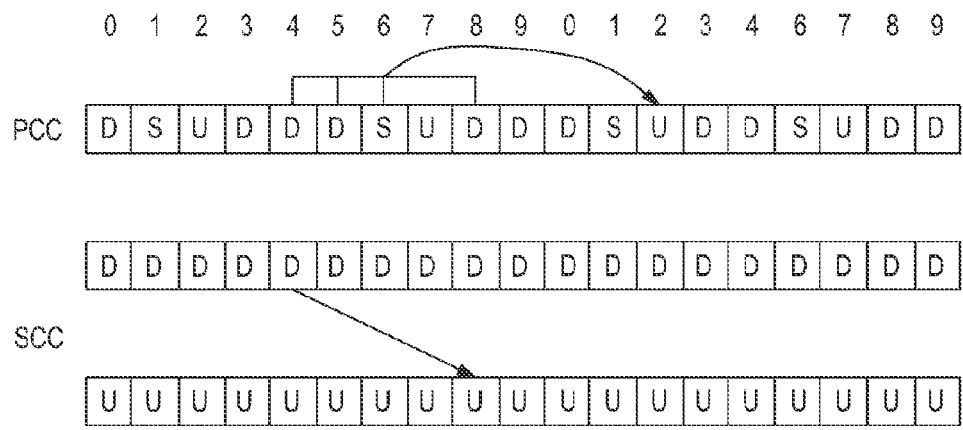
FIG. 6 illustrates HARQ-ACK timing and a determination of a CC transmitting HARQ-ACK feedback information in accordance with an embodiment of the present invention.

FIG. 6 illustrates HARQ-ACK timing and a determination of a CC transmitting HARQ-ACK feedback information in accordance with an embodiment of the present invention. In FIG. 6, it is assumed that a BS configures two CCs for a CA UE, i.e., a PCC and an SCC.

Referring to FIG. 6, the PCC is configured with TDD uplink/downlink configuration 2, and the SCC is configured with an FDD configuration. In this combination, the PCC follows a HARQ-ACK timing of TDD uplink/downlink configuration 2, and HARQ-ACK information of the PCC is transmitted on the PCC. The SCC follows an FDD HARQ-ACK timing relationship, and HARQ-ACK information of the SCC is transmitted on the SCC.

In accordance with an embodiment of the present invention, CCs configured for the UE are grouped into two groups, i.e., all of the CCs configured with an FDD configuration are grouped into one group, and all of the CCs configured with a TDD configuration are grouped into the other group. All of the CCs in the group with the FDD configuration follow an FDD HARQ-ACK timing. When the PCC is an uplink subframe, HARQ-ACK information of the group with the FDD configuration is transmitted on the PCC. When the PCC is a downlink subframe, the HARQ-ACK information of the group with the FDD configuration is transmitted on a specific FDD CC. For each CC in the group with the TDD configuration a HARQ-ACK timing is determined according to TDD uplink/downlink configurations of the CCs in the group, and HARQ-ACK information of the group with the TDD configuration is transmitted on the PCC. As described above, HARQ-ACK information of each CC is transmitted through the PCC as much as possible, thus it is consistent with previous HARQ-ACK transmission modes. When the PCC is a downlink subframe and cannot transmit HARQ-ACK information, the HARQ-ACK information is transmitted through an FDD CC.

Again, RRC signaling may be used to indicate which CC is used for transmitting the HARQ-ACK information among the CCs in the group with FDD configuration. The indicated CC is called a second PCC.

Figure 7:
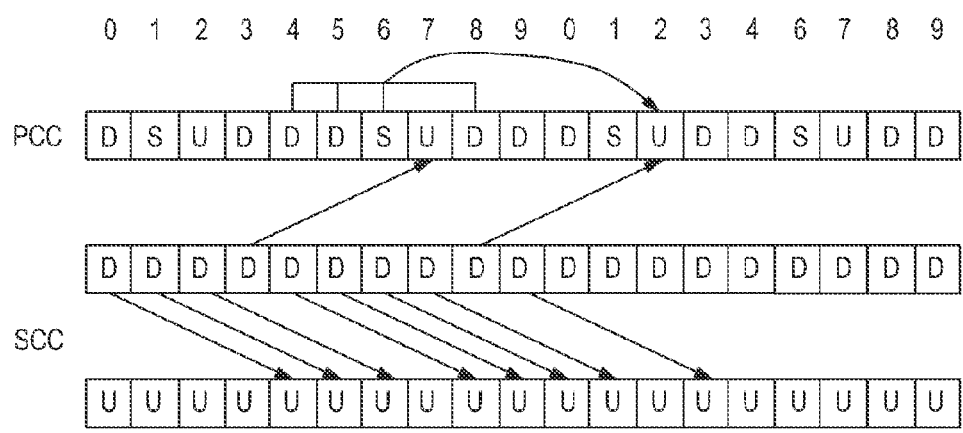
FIG. 7 illustrates HARQ-ACK timing and a determination of a CC transmitting HARQ-ACK feedback information in accordance with an embodiment of the present invention.

FIG. 7 illustrates HARQ-ACK timing and a determination of a CC transmitting HARQ-ACK feedback information in accordance with an embodiment of the present invention. In FIG. 7, it is assumed that a BS configures two CCs for a CA UE, i.e., a PCC and an SCC.

Referring to FIG. 7, the PCC is configured with TDD uplink/downlink configuration 2, and the SCC is configured with an FDD configuration. In this combination, the PCC follows a HARQ-ACK timing of the TDD uplink/downlink configuration 2, and HARQ-ACK information of the PCC is transmitted on the PCC. The SCC follows an FDD HARQ-ACK timing, HARQ-ACK information of the SCC is transmitted on the PCC in subframe 2 or subframe 7, and the HARQ-ACK information of the SCC is transmitted on the SCC in subframes 0, 1, 3, 4, 5, 6, 8, or 9.

In accordance with an embodiment of the present invention, CCs configured for the UE are grouped into two groups, i.e., all of the CCs configured with an FDD configuration are grouped into one group, and all of the CCs configured with a TDD configuration are grouped into the other group. All FDD CCs follow a HARQ-ACK timing of the PCC. However, for each CC in the group with the TDD configuration, HARQ-ACK timing is determined according to the TDD uplink/downlink configurations of the CCs in the group. HARQ-ACK information of all of the CCs is transmitted on the PCC.

Specifically, for a downlink subframe of an FDD CC, if the PCC is a downlink subframe on the same subframe timing, a HARQ-ACK timing of the FDD downlink subframe is determined according to a HARQ-ACK timing of the downlink subframe of the PCC on the same subframe. For the downlink subframe of the FDD CC, if the PCC is an uplink subframe on the same subframe timing, there is not a corresponding uplink subframe used for transmitting the HARQ-ACK information on the same subframe in accordance with a HARQ-ACK timing of the PCC, then the FDD subframe could not transmit downlink data. For each CC in the group with TDD configuration a HARQ-ACK timing is determined according to a TDD uplink/downlink configuration of each CC in the group. HARQ-ACK information of all of the CCs is transmitted on the PCC. Herein, HARQ-ACK timing of all of the CCs is consistent, and HARQ-ACK of all of the CCs is transmitted on the PCC, so that the implementation complexity is lower compared with the methods illustrates in FIGS. 6 and 7. However, part of downlink subframes may not be able to transmit downlink data on the FDD CC, which results in waste of downlink resources.

Figure 8:
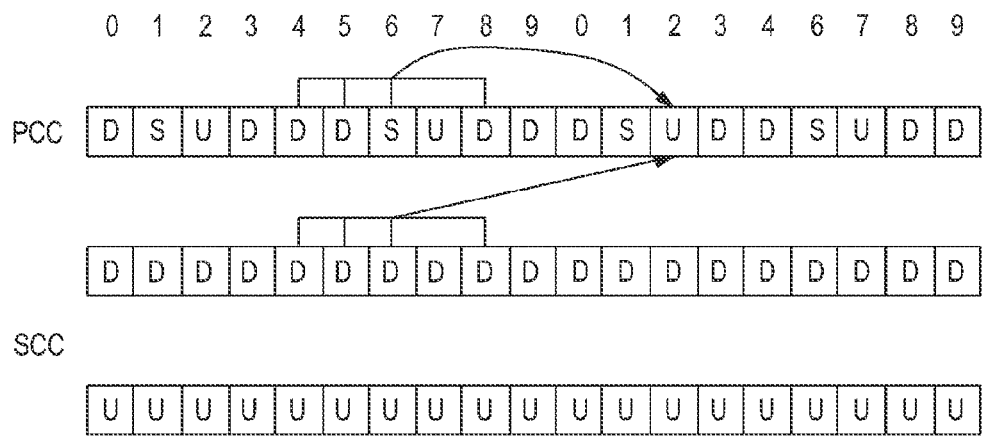
FIG. 8 illustrates HARQ-ACK timing and a determination of a CC transmitting HARQ-ACK feedback information in accordance with an embodiment of the present invention.

FIG. 8 illustrates HARQ-ACK timing and a determination of a CC transmitting HARQ-ACK feedback information in accordance with an embodiment of the present invention. In FIG. 8, it is assumed that a BS configures two CCs for a CA UE, i.e., a PCC and an SCC.

Referring to FIG. 8, the PCC is configured with TDD uplink/downlink configuration 2, and the SCC is configured with an FDD configuration. In this combination, the PCC follows a HARQ-ACK timing of TDD uplink/downlink configuration 2, and HARQ-ACK information of the PCC is transmitted on the PCC. The SCC follows the HARQ-ACK timing of the TDD uplink/downlink configuration 2, HARQ-ACK information of downlink subframes 4, 5, 6, and 8 of radio frame n is transmitted on uplink subframe 2 of radio frame n+1 of the PCC, and HARQ-ACK information of downlink subframe 9 of radio frame n and HARQ-ACK information of downlink subframes 0, 1, and 3 of radio frame n+1 are transmitted on uplink subframe 7 of radio frame n+1 of the PCC. For the SCC and downlink subframes 2 and 7 of radio frame n, subframes 2 and 7 of the PCC are all uplink subframes, therefore, downlink subframes 2 and 7 of the SCC do not transmit downlink data.

In accordance with an embodiment of the present invention, for each CC in the group with TDD configuration, a HARQ-ACK timing is determined according to TDD uplink/downlink configurations of the CCs in the group, and HARQ-ACK information of the PCC is transmitted on the PCC. HARQ-ACK information of downlink subframes is distributed by FDD CCs as evenly as possible on each uplink subframe of the PCC for transmission. That is, it is ensured that the number of subframes difference among FDD HARQ-ACK information transmitted by each uplink subframe of the PCC is the smallest one.

Figure 9:
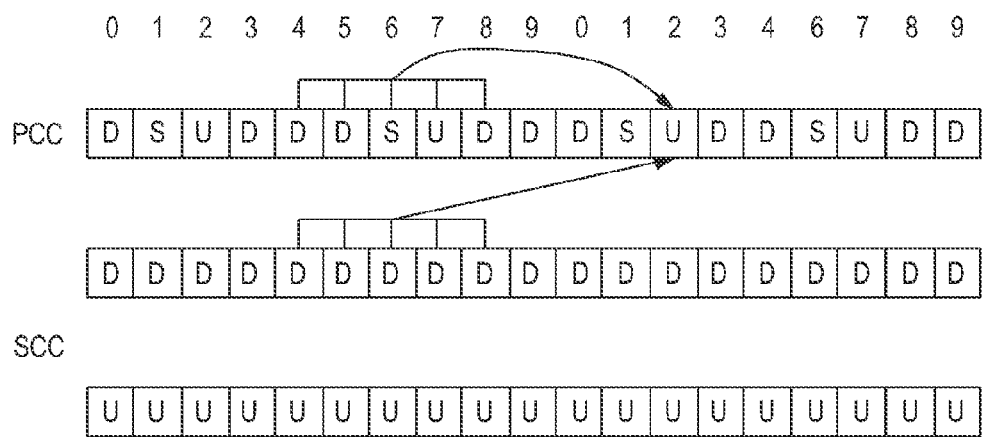
FIG. 9 illustrates HARQ-ACK timing and a determination of a CC transmitting HARQ-ACK feedback information in accordance with an embodiment of the present invention.

FIG. 9 illustrates HARQ-ACK timing and a determination of a CC transmitting HARQ-ACK feedback information in accordance with an embodiment of the present invention. In FIG. 9, HARQ-ACK timing of FDD CCs are completely rearranged, but the HARQ-ACK information transmitted on each uplink subframe of the PCC is distributed more averagely. Herein, more averagely means that the number of downlink subframes on which HARQ-ACK are transmitted in one uplink subframes keeps as equal as possible for each uplink subframe. As a result, uplink resources are used fully and evenly.

Referring to FIG. 9, the PCC is configured with TDD uplink/downlink configuration 2, and the SCC is configured with an FDD configuration. In this combination, the PCC follows a HARQ-ACK timing of TDD uplink/downlink configuration 2, and HARQ-ACK information of the PCC is transmitted on the PCC. The SCC follows a new HARQ-ACK timing, so that the number of downlink subframes for which the FDD HARQ-ACK information is transmitted on uplink subframes of the PCC is more average, and the shortest duration for the UE processing data is met. Generally, the smaller a time delay between transmission of HARQ-ACK feedback of a downlink subframe and transmission of the downlink subframe is, the better. HARQ-ACK feedback information of downlink subframes 4, 5, 6, 7, and 8 of radio frame n may be transmitted on uplink subframe 2 of radio frame n+1 of the PCC, and HARQ-ACK feedback information of downlink subframe 9 of radio frame n and HARQ-ACK feedback information of downlink subframes 0, 1, 2, and 3 of radio frame n+1 may be transmitted on uplink subframe 7 of radio frame n+1 of the PCC.

The above-described methods for determining the timing and the CC transmitting the HARQ-ACK, as illustrated in FIGS. 3 to 9, are also applicable to a scenario in which HARQ-ACK information is carried through a PUSCH or a PUCCH.

In conventional systems, when HARQ-ACK information is carried through a PUSCH under a TDD configuration, if the PUSCH carrying the HARQ-ACK information is scheduled through a Physical Downlink Control CHannel (PDCCH), then the PDCCH includes an Uplink Downlink Assignment Index (UL DAI) field, which is used to indicate the number of downlink subframes corresponding to the HARQ-ACK information carried in the PUSCH. When the HARQ-ACK information is carried through the PUSCH under an FDD configuration, uplink subframes carrying the HARQ-ACK information are determined. Therefore, the PDCCH scheduling the PUSCH does not include the UL DAI field. For a CA UE simultaneously configured with the TDD and FDD configurations, the number of downlink subframes corresponding to HARQ-ACK feedback information transmitted on a current uplink subframe may be determined according to methods described below.

Specifically, if HARQ-ACK information is transmitted on a PUSCH and the PUSCH transmission is scheduled by a PDCCH that does not include a UL DAI field or the PUSCH transmission is not scheduled by a detected PDCCH, for a CC, the number of downlink subframes for which HARQ-ACK feedback information is transmitted on the PUSCH of the current uplink subframe is the size of a bundling window of the CC.

If the PUSCH transmission is scheduled by a PDCCH including the UL DAI field, then for any CC, the number of downlink subframes for which HARQ-ACK feedback information is transmitted on the PUSCH of the current uplink subframe is determined according to the size of the bundling window of the CC and the UL DAI. Particularly, the number of the downlink subframes is equal to the minimum value between the size of the bundling window and a value of the UL DAI field.

For a BS that configures two CCs for a CA UE, i.e., a PCC and an SCC, the PCC may be configured with an FDD configuration, and the SCC may be configured with TDD uplink/downlink configuration 2. In this combination, assuming that the PCC follows an FDD HARQ-ACK timing and the SCC follows the FDD HARQ-ACK timing, if a PUSCH is transmitted on the PCC and a PDCCH scheduling the PUSCH of the FDD CC does not include a UL DAI field, the number of downlink subframes corresponding to HARQ-ACK information of the FDD CC or the TDD CC is equal to the size of a bundling window of each CC. If the PUSCH is transmitted on the SCC and is scheduled by the PDCCH, and the PDCCH scheduling the PUSCH of the TDD CC includes the UL DAI field, the number of downlink subframes corresponding to HARQ-ACK information of the FDD CC and the number of downlink subframes corresponding to HARQ-ACK information of the TDD CC are respectively equal to min.{UL DAI, the size of the bundling window of the CC}.

In addition, after a HARQ-ACK timing and a CC transmitting transmission HARQ-ACK are determined, as described above, when the HARQ-ACK information is transmitted according to PUCCH format 1b for channel selection, mapping the HARQ-ACK information may be performed using a TDD table for mapping, i.e., Table 5, Table 6, or Table 7, as shown below. Another method is to use an FDD table for mapping, i.e., Table 2, Table 3, or Table 4, as shown below.

It is noted that various embodiments of the present invention described herein are not limited to the use of a channel selection mapping form, which has already existed in a conventional LTE system, and may use other channel selection mapping forms.

TABLE 2

| HARQ-ACK(0) | HARQ-ACK(1) | $n_{PUCCH}^{(1)}$ | b(0)b(1) |
| --- | --- | --- | --- |
| ACK | ACK | $n_{PUCCH, 1}^{(1)}$ | 1, 1 |
| ACK | NACK/DTX | $n_{PUCCH, 0}^{(1)}$ | 1, 1 |
| NACK/DTX | ACK | $n_{PUCCH, 1}^{(1)}$ | 0, 0 |
| NACK | NACK/DTX | $n_{PUCCH, 0}^{(1)}$ | 0, 0 |
| DTX | NACK/DTX | No Transmission | |

TABLE 3

| HARQ-ACK(0) | HARQ-ACK(1) | HARQ-ACK(2) | $n_{PUCCH}^{(1)}$ | b(0)b(1) |
| --- | --- | --- | --- | --- |
| ACK | ACK | ACK | $n_{PUCCH, 1}^{(1)}$ | 1, 1 |
| ACK | NACK/DTX | ACK | $n_{PUCCH, 1}^{(1)}$ | 1, 0 |
| NACK/DTX | ACK | ACK | $n_{PUCCH, 1}^{(1)}$ | 0, 1 |
| NACK/DTX | NACK/DTX | ACK | $n_{PUCCH, 2}^{(1)}$ | 1, 1 |
| ACK | ACK | NACK/DTX | $n_{PUCCH, 0}^{(1)}$ | 1, 1 |
| ACK | NACK/DTX | NACK/DTX | $n_{PUCCH, 0}^{(1)}$ | 1, 0 |

TABLE 3-continued

| HARQ-ACK(0) | HARQ-ACK(1) | HARQ-ACK(2) | $n_{PUCCH}^{(1)}$ | b(0)b(1) |
|---|---|---|---|---|
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | | No Transmission |

TABLE 4

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | | No Transmission |

TABLE 5

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

TABLE 6

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

TABLE 7

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

As shown above, when transmitting HARQ-ACK feedback information, wherein a CC is configured with a TDD configuration and a CC configured with an FDD configuration in a CA simultaneously, a HARQ-ACK timing and a CC transmitting HARQ-ACK feedback information are determined according to a composition structure of CCs. The HARQ-ACK feedback information is transmitted on the determined CC according to the determined HARQ-ACK timing. Therefore, HARQ-ACK information can be transmitted effectively when a CC is configured with a TDD configuration and a CC is configured with an FDD configuration, simultaneously, in CA.

Figure 10:
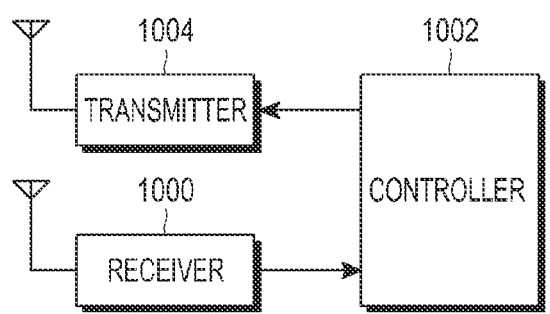
FIG. 10 is a block diagram illustrating a UE according to an embodiment of the present invention.

FIG. 10 is a block diagram illustrating a UE according to an embodiment of the present invention.

Referring to FIG. 10, the UE includes a receiver 1000, a controller 1002, and a transmitter 1004. The UE may also include other units, e.g., a display, a keypad, etc., which are not shown here for purposes of clarity.

The receiver 1000 receives signals and data. The transmitter 1004 transmits signals, data, and HARQ-ACK feedback information. The controller 1002 controls the receiver 1000 and the transmitter 1004.

Specifically, the controller 1002 performs operations according to the above-described embodiments of the present invention. For example, the controller 1002 determines a HARQ-ACK timing and a CC for transmitting the HARQ-ACK feedback information, based on a composition structure of CCs configured for the UE, and controls to the transmitter 1004 to transmit the HARQ-ACK feedback information on a PUCCH or PUSCH of the determined CC, based on the determined HARQ-ACK timing.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for transmitting hybrid automatic repeat request acknowledgement (HARQ-ACK) feedback information by a user equipment (UE) in a wireless communication system, the method comprising:
   determining a HARQ-ACK timing and a component carrier (CC) for transmitting the HARQ-ACK feedback information, based on a composition structure indicating that a frequency division duplexing (FDD) CC or a time division duplexing (TDD) CC configured for the UE is a primary CC (PCC); and
   transmitting the HARQ-ACK feedback information on a physical uplink control channel (PUCCH) or a physical uplink shared channel (PUSCH) of the determined CC, based on the determined HARQ-ACK timing,
   wherein, if the composition structure indicates that the FDD CC is the PCC, determining the HARQ-ACK timing and the CC for transmitting the HARQ-ACK feedback information comprises:
   grouping first CCs configured with an FDD configuration into a first group;
   grouping second CCs configured with a TDD configuration into a second group; and
   determining the HARQ-ACK timing for each of the second CCs in the second group based on TDD uplink/downlink configurations of the second CCs,
   wherein HARQ-ACK feedback information of the first group is transmitted on the PCC based on an FDD HARQ-ACK timing, and HARQ-ACK feedback information of the second group is transmitted on a specific TDD CC based on the determined HARQ-ACK timing.

2. The method of claim 1, further comprising indicating the specific TDD CC through radio resource control (RRC) signaling.

3. The method of claim 1, wherein if the composition structure indicates that the FDD CC is the PCC, the HARQ-ACK feedback information of all CCs configured for the UE is transmitted on the PCC based on an FDD HARQ-ACK timing.

4. The method of claim 1, wherein if the HARQ-ACK feedback information is transmitted based on a PUCCH format of channel selection, the HARQ-ACK feedback information uses one of TDD mapping and FDD mapping.

5. The method of claim 1, wherein a number of downlink subframes for which the HARQ-ACK feedback information is transmitted on the PUSCH of a current uplink subframe is determined based on at least one of a size of a bundling window of the CC and an uplink/downlink assignment index (UL DAI) field included in a physical downlink control channel (PDCCH).

6. A method for transmitting hybrid automatic repeat request acknowledgment (HARQ-ACK) feedback information by a user equipment (UE) in a wireless communication system, the method comprising:
   determining a HARQ-ACK timing and a component carrier (CC) for transmitting the HARQ-ACK feedback information, based on a composition structure indicating that a frequency division duplexing (FDD) CC or a time division duplexing (TDD) CC configured for the UE is primary CC (PCC); and
   transmitting the HARQ-ACK feedback information on a physical uplink control channel (PUCCH) or a physical uplink shared channel (PUSCH) of the determined CC, based on the determined HARQ-ACK timing,
   wherein if the composition structure indicates that the FDD CC is the PCC, determining the HARQ-ACK timing and the CC for transmitting the HARQ-ACK feedback information comprises:
   grouping first CCs configured with an FDD configuration into a first group;
   grouping second CCs configured with a TDD configuration into a second group; and
   determining the HARQ-ACK timing for each of the second CCs in the second group, based on TDD uplink/downlink configurations of the second CCs,
   wherein HARQ-ACK feedback information of the first group is transmitted based on an FDD HARQ-ACK timing, and HARQ-ACK feedback information of the second group is transmitted on the PCC based on the determined HARQ-ACK timing.

7. A method for transmitting hybrid automatic repeat request acknowledgment (HARQ-ACK) feedback information by a user equipment (UE) in a wireless communication system, the method comprising:
   determining a HARQ-ACK timing and a component carrier (CC) for transmitting the HARQ-ACK feedback information, based on a composition structure indicating that a frequency division duplexing (FDD) CC or a time division duplexing (TDD) CC configured for the UE is primary CC (PCC); and
   transmitting the HARQ-ACK feedback information on a physical uplink control channel (PUCCH) or a physical uplink shared channel (PUSCH) of the determined CC, based on the determined HARQ-ACK timing,
   wherein if the composition structure indicates that the TDD CC is the PCC, determining the HARQ-ACK timing and the CC for transmitting the HARQ-ACK feedback information comprises:
   grouping first CCs configured with an FDD configuration into a first group;
   grouping second CCs configured with a TDD configuration into a second group; and
   determining the HARQ-ACK timing for each of the second CCs in the second group based on TDD uplink/downlink configurations of the second CCs; and
   wherein HARQ-ACK feedback information of the first group is transmitted on a specific FDD CC based on an FDD HARQ-ACK timing, and HARQ-ACK feedback information of the second group is transmitted on the PCC based on the determined HARQ-ACK timing.

8. A method for transmitting hybrid automatic repeat request acknowledgment (HARQ-ACK) feedback information by a user equipment (UE) in a wireless communication system, the method comprising:
   determining a HARQ-ACK timing and a component carrier (CC) for transmitting the HARQ-ACK feedback information, based on a composition structure indicating that a frequency division duplexing (FDD) CC or a time division duplexing (TDD) CC configured for the UE is primary CC (PCC); and transmitting the HARQ-ACK feedback information on a physical uplink control channel (PUCCH) or a physical uplink shared channel (PUSCH) of the determined CC, based on the determined HARQ-ACK timing, wherein if the composition structure indicates that the TDD CC is the PCC, determining the HARQ-ACK timing and the CC for transmitting the HARQ-ACK feedback information comprises:

grouping first CCs configured with an FDD configuration into a first group;

grouping second CCs configured with a TDD configuration into a second group; and determining the HARQ-ACK timing for each of the second CCs in the second group based on the TDD uplink/downlink configurations of the second CCs, wherein HARQ-ACK feedback information of the first group is transmitted on the PCC based on an FDD HARQ-ACK timing, if the PCC is an uplink subframe, wherein the HARQ-ACK feedback information of the first group is transmitted on a specific FDD CC based on an FDD HARQ-ACK timing, if the PCC is a Downlink subframe, and wherein HARQ-ACK feedback information of the second group is transmitted on the PCC based on the determined HARQ-ACK timing.

9. A method for transmitting hybrid automatic repeat request acknowledgment (HARQ-ACK) feedback information by a user equipment (UE) in a wireless communication system, the method comprising:

determining a HARQ-ACK timing and a component carrier (CC) for transmitting the HARQ-ACK feedback information, based on a composition structure indicating that a frequency division duplexing (FDD) CC or a time division duplexing (TDD) CC configured for the UE is primary CC (PCC); and transmitting the HARQ-ACK feedback information on a physical uplink control channel (PUCCH) or a physical uplink shared channel (PUSCH) of the determined CC, based on the determined HARQ-ACK timing, wherein if the composition structure indicates that the TDD CC is the PCC, determining the HARQ-ACK timing and the CC for transmitting the HARQ-ACK feedback information comprises:

grouping first CCs configured with an FDD configuration into a first group;

grouping second CCs configured with a TDD configuration into a second group; and determining the HARQ-ACK timing for each of the second CCs in the second group based on TDD uplink/downlink configurations of the second CCs, wherein HARQ-ACK feedback information of the first group is transmitted on the PCC based on a HARQ-ACK timing of the PCC, and HARQ-ACK feedback information of the second group is transmitted on the PCC based on the determined HARQ-ACK timing.

10. A method for transmitting hybrid automatic repeat request acknowledgment (HARQ-ACK) feedback information by a user equipment (UE) in a wireless communication system, the method comprising:

determining a HARQ-ACK timing and a component carrier (CC) for transmitting the HARQ-ACK feedback information, based on a composition structure indicating that a frequency division duplexing (FDD) CC or a time division duplexing (TDD) CC configured for the UE is primary CC (PCC); and transmitting the HARQ-ACK feedback information on a physical uplink control channel (PUCCH) or a physical uplink shared channel (PUSCH) of the determined CC, based on the determined HARQ-ACK timing, wherein if the composition structure indicates that the TDD CC is the PCC, determining the HARQ-ACK timing and the CC for transmitting the HARQ-ACK feedback information comprises:

grouping first CCs configured with an FDD configuration into a first group;

grouping second CCs configured with a TDD configuration into a second group; and determining the HARQ-ACK timing for each of the second CCs in the second group based on TDD Uplink/Downlink configurations of the second CCs, wherein HARQ-ACK feedback information of the second group is transmitted on the PCC based on the determined HARQ-ACK timing, and wherein HARQ-ACK feedback information of the first group is distributed on each uplink subframe of the PCC, such that a difference in a number of subframes between the HARQ-ACK feedback information of the first group transmitted by the each uplink subframe of the PCC is as small as possible.

11. The method of claim 10, wherein the HARQ-ACK feedback information of the first group is distributed on the each uplink subframe of the PCC, such that a time delay between transmission of the HARQ-ACK feedback information of the first group and transmission of a related downlink subframe is as small as possible.

12. A method for transmitting hybrid automatic repeat request acknowledgment (HARQ-ACK) feedback information by a user equipment (UE) in a wireless communication system, the method comprising:

determining a HARQ-ACK timing and a component carrier (CC) for transmitting the HARQ-ACK feedback information, based on a composition structure indicating that a frequency division duplexing (FDD) CC or a time division duplexing (TDD) CC configured for the UE is primary CC (PCC); and transmitting the HARQ-ACK feedback information on a physical uplink control channel (PUCCH) or a physical uplink shared channel (PUSCH) of the determined CC, based on the determined HARQ-ACK timing, wherein if the HARQ-ACK feedback information is transmitted on the PUSCH, and a transmission of the PUSCH is scheduled by a physical downlink control channel (PDCCH) that does not include an uplink/downlink assignment index (UL DAI) field, or if the transmission of the PUSCH is not scheduled by a detected PDCCH, for a CC configured for the UE, a number of downlink subframes for which the HARQ-ACK feedback information is transmitted on the PUSCH of a current uplink subframe is equal to a size of a bundling window of the CC; and wherein if the transmission of the PUSCH is scheduled by a PDCCH that includes the UL DAI field, the number of the downlink subframes for which the HARQ-ACK feedback information is transmitted on the PUSCH of the current uplink subframe is a minimum value between a size of the bundling window of the CC and a value of the UL DAI field.

13. A user equipment (UE) for transmitting hybrid automatic repeat request acknowledgement (HARQ-ACK) feedback information in a wireless communication system, the UE comprising:
a controller configured to determine a HARQ-ACK timing and a component carrier (CC) for transmitting the HARQ-ACK feedback information based on a composition structure indicating that a frequency division duplexing (FDD) CC or a time division duplexing (TDD) CC configured for the UE is a primary CC (PCC); and
a transmitter configured to transmit the HARQ-ACK feedback information on a physical uplink control channel (PUCCH) or a physical uplink shared channel (PUSCH) of the determined CC, based on the determined HARQ-ACK timing,
wherein the controller is further configured to group first CCs configured with an FDD configuration into a first group, group second CCs configured with a TDD configuration into a second group, control the transmitter to transmit HARQ-ACK feedback information of the first group on the PCC based on an FDD HARQ-ACK timing, determine the HARQ-ACK timing for each of the second CCs in the second group based on TDD uplink/downlink configurations of the second CCs, and controls the transmitter to transmit HARQ-ACK feedback information of the second group on a specific TDD CC based on the determined HARQ-ACK timing.

14. The UE according to claim 13, wherein if the HARQ-ACK feedback information is transmitted based on a PUCCH format of channel selection, the HARQ-ACK feedback information uses one of TDD mapping and FDD mapping.

15. A user equipment (UE) for transmitting hybrid automatic repeat request acknowledgment (HARQ-ACK) feedback information in a wireless communication system, the UE comprising:
a controller configured to determine a HARQ-ACK timing and a component carrier (CC) for transmitting the HARQ-ACK feedback information based on a composition structure indicating that a frequency division duplexing (FDD) CC or a time division duplexing (TDD) CC configured for the UE is primary CC (PCC); and
a transmitter configured to transmit the HARQ-ACK feedback information on a physical uplink control channel (PUCCH) or a physical uplink shared channel (PUSCH) of the determined CC, based on the determined HARQ-ACK timing,
wherein the controller is further configured to group first CCs configured with an FDD configuration into a first group, group second CCs configured with a TDD configuration into a second group, control the transmitter to transmit HARQ-ACK feedback information of the first group based on an FDD HARQ-ACK timing, determine the HARQ-ACK timing for each of the second CCs in the second group based on TDD uplink/downlink configurations of the second CCs, control the transmitter to transmit HARQ-ACK feedback information of the second group on the PCC, and control the transmitter to transmit HARQ-ACK feedback information of all of the CCs configured for the UE on the PCC based on the FDD HARQ-ACK timing.

16. A user equipment (UE) for transmitting hybrid automatic repeat request acknowledgment (HARQ-ACK) feedback information in a wireless communication system, the UE comprising:
a controller configured to determine a HARQ-ACK timing and a component carrier (CC) for transmitting the HARQ-ACK feedback information based on a composition structure indicating that a frequency division duplexing (FDD) CC or a time division duplexing (TDD) CC configured for the UE is primary CC (PCC); and
a transmitter configured to transmit the HARQ-ACK feedback information on a physical uplink control channel (PUCCH) or a physical uplink shared channel (PUSCH) of the determined CC, based on the determined HARQ-ACK timing,
wherein the controller is further configured to group first CCs configured with an FDD configuration into a first group, group second CCs configured with a TDD configuration into a second group, control the transmitter to transmit HARQ-ACK feedback information of the first group on a specific FDD CC based on an FDD HARQ-ACK timing, determine the HARQ-ACK timing for each of the second CCs in the second group based on TDD uplink/downlink configurations of the second CCs, and control the transmitter to transmit HARQ-ACK feedback information of the second group on the PCC based on the determined HARQ-ACK timing, or
wherein the controller is further configured to group third CCs configured with the TDD configuration into a third group, group fourth CCs configured into a fourth group, control the transmitter to transmit the HARQ-ACK feedback information of the third group on the PCC based the FDD HARQ-ACK timing, if the PCC is an uplink subframe, control the transmitter to transmit the HARQ-ACK feedback information of the third group on the specific FDD CC based the FDD HARQ-ACK timing, if the PCC is a downlink subframe, determine the HARQ-ACK timing for each of the fourth CCs based on the TDD uplink/downlink configurations of the fourth CCs in the fourth group, and control the transmitter to transmit the HARQ-ACK feedback information of the fourth group on the PCC based on the determined HARQ-ACK timing.

17. A user equipment (UE) for transmitting hybrid automatic repeat request acknowledgment (HARQ-ACK) feedback information in a wireless communication system, the UE comprising:
a controller configured to determine a HARQ-ACK timing and a component carrier (CC) for transmitting the HARQ-ACK feedback information based on a composition structure indicating that a frequency division duplexing (FDD) CC or a time division duplexing (TDD) CC configured for the UE is primary CC (PCC); and
a transmitter configured to transmit the HARQ-ACK feedback information on a physical uplink control channel (PUCCH) or a physical uplink shared channel (PUSCH) of the determined CC, based on the determined HARQ-ACK timing,
wherein the controller is further configured to group first CCs configured with an FDD configuration into a first group, group second CCs configured with a TDD configuration into a second group, control the transmitter to transmit HARQ-ACK feedback information of the first group on the PCC based on a HARQ-ACK timing of the PCC, determine the HARQ-ACK timing for each of the second CCs in the second group based on TDD uplink/downlink configurations of the second CCs, and control the transmitter to transmit HARQ-ACK feedback information of the second group on the PCC based on the determined HARQ-ACK timing.

18. A user equipment (UE) for transmitting hybrid automatic repeat request acknowledgment (HARQ-ACK) feedback information in a wireless communication system, the UE comprising:
   a controller configured to determine a HARQ-ACK timing and a component carrier (CC) for transmitting the HARQ-ACK feedback information based on a composition structure indicating that a frequency division duplexing (FDD) CC or a time division duplexing (TDD) CC configured for the UE is primary CC (PCC); and
   a transmitter configured to transmit the HARQ-ACK feedback information on a physical uplink control channel (PUCCH) or a physical uplink shared channel (PUSCH) of the determined CC, based on the determined HARQ-ACK timing,
   wherein the controller is further configured to group first CCs configured with an FDD configuration into a first group, group second CCs configured with a TDD configuration into a second group, determine the HARQ-ACK timing for each of the second CCs in the second group based on TDD uplink/downlink configurations of the second CCs, control the transmitter to transmit HARQ-ACK feedback information of the second group on the PCC based on the determined HARQ-ACK timing, and distribute HARQ-ACK feedback information of the first group on each uplink subframe of the PCC, such that a difference in a number of subframes between the HARQ-ACK feedback information of the first group transmitted by each uplink subframe of the PCC is as small as possible.

19. A user equipment (UE) for transmitting hybrid automatic repeat request acknowledgment (HARQ-ACK) feedback information in a wireless communication system, the UE comprising:
   a controller configured to determine a HARQ-ACK timing and a component carrier (CC) for transmitting the HARQ-ACK feedback information based on a composition structure indicating that a frequency division duplexing (FDD) CC or a time division duplexing (TDD) CC configured for the UE is primary CC (PCC); and
   a transmitter configured to transmit the HARQ-ACK feedback information on a physical uplink control channel (PUCCH) or a physical uplink shared channel (PUSCH) of the determined CC, based on the determined HARQ-ACK timing,
   wherein if the HARQ-ACK feedback information is transmitted on the PUSCH and a transmission of the PUSCH is scheduled by a physical downlink control channel (PDCCH) that does not include an uplink/downlink assignment index (UL DAI) field, or if the transmission of the PUSCH is not scheduled by a detected PDCCH, for a CC configured for the UE, a number of downlink subframes for which the HARQ-ACK feedback information is transmitted on the PUSCH of a current uplink subframe is equal to a size of a bundling window of the CC, and
   wherein if the transmission of the PUSCH is scheduled by a PDCCH that includes the UL DAI field, the number of the downlink subframes for which the HARQ-ACK feedback information is transmitted on the PUSCH of the current uplink subframe is a minimum value between the size of the bundling window of the CC and a value of the UL DAI field.

* * * * *